United States Patent
Kamiwada et al.

(10) Patent No.: US 6,741,266 B1
(45) Date of Patent: May 25, 2004

(54) GUI DISPLAY, AND RECORDING MEDIUM INCLUDING A COMPUTERIZED METHOD STORED THEREIN FOR REALIZING THE GUI DISPLAY

(75) Inventors: Toru Kamiwada, Kawasaki (JP); Takushi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 09/649,065

(22) Filed: Aug. 29, 2000

(30) Foreign Application Priority Data

Sep. 13, 1999  (JP) .......................................... 11-259475

(51) Int. Cl.⁷ ............................................. G09G 5/00
(52) U.S. Cl. ...................... 345/768; 345/640; 345/815
(58) Field of Search ................................. 345/629, 768, 345/810, 813, 814, 817, 862, 619, 815, 764, 385, 640

(56) References Cited

U.S. PATENT DOCUMENTS

| | | | | |
|---|---|---|---|---|
| 5,651,107 A | * | 7/1997 | Frank et al. | 345/768 |
| 5,936,610 A | * | 8/1999 | Endo | 345/629 |
| 6,181,337 B1 | * | 1/2001 | Okawa et al. | 345/768 |
| 6,333,753 B1 | * | 12/2001 | Hinckley | 345/768 |
| 6,353,450 B1 | * | 3/2002 | DeLeeuw | 345/768 |

FOREIGN PATENT DOCUMENTS

| | | |
|---|---|---|
| JP | 63-35070 | 2/1988 |
| JP | 3-62221 | 3/1991 |
| JP | 3-84619 | 4/1991 |
| JP | 5-11925 | 1/1993 |
| JP | 5-173743 | 7/1993 |
| JP | 6-89325 | 3/1994 |
| JP | 7-64755 | 3/1995 |
| JP | 7-210350 | 8/1995 |
| JP | 7-210353 | 8/1995 |
| JP | 8-179913 | 7/1996 |
| JP | 8-234953 | 9/1996 |
| JP | 8-272944 | 10/1996 |
| JP | 9-62473 | 3/1997 |
| JP | 9-73353 | 3/1997 |
| JP | 10-222338 | 8/1998 |
| JP | 10-333871 | 12/1998 |
| JP | 11-353069 | 12/1999 |

OTHER PUBLICATIONS

U.S. patent application Ser. No. 08/177,295, filed Jan. 4, 1994, Now Abandoned.
U.S. patent application Ser. No. 08/177,296, filed Jan. 4, 1994, Now patent 6201539.

* cited by examiner

*Primary Examiner*—Matthew Luu
(74) *Attorney, Agent, or Firm*—Staas & Halsey LLP

(57) ABSTRACT

A graphic user interface display comprises a display-indication determining unit determining whether display indication is inputted, a position detecting unit detecting a position of a pointer on the picture, and a processing unit adjusting a transparency of the graphic user interface based on the position detected by the position detecting unit so as to display the graphic user interface.

14 Claims, 16 Drawing Sheets

GUI DISPLAY, AND RECORDING MEDIUM INCLUDING A COMPUTERIZED METHOD STORED THEREIN FOR REALIZING THE GUI DISPLAY

BACKGROUND OF THE INVENTION

1. Field of the Invention

The present invention generally relates to GUI (Graphic User Interface) displays, and more particularly to a GUI display capable of providing convenient operations of browsing pictures displayed on a large screen by zooming them in or out at will.

Also, the present invention relates to a recording medium including a computerized method stored therein for operating such a GUI display.

2. Description of the Related Art

In recent years, various kinds of CPU-carried electronic equipment, particularly, personal computers such as desktops, notebooks that can access Internet services have been increasingly become popular. Each of such personal computers typically employs a graphical user interface (hereinafter referred to as GUI) to make it easy to operate. The GUI may include a plurality of graphical elements such as icons, buttons, labels, windows, and the like, which are displayed on a screen and operated by a pointing device, e.g., a mouse. These graphical elements are hereinafter referred to as GUI components.

The graphical components displayed on the screen may be superimposed upon a picture to be browsed or placed on a side of the picture, and may be dragged to another place or switched between display and non-display according to user's indication.

At present, the personal computer equipped with a plasma display having a large screen (approximately 50 inches in diagonal line) has been developed for home use.

FIGS. 1A through 1C are diagrams illustrating a conventional GUI display having GUI components 14 and 16 displayed on a large picture 10 of the screen (not shown). Herein, the GUI component 14 and 16 are tool bars each including a plurality of marks corresponding to respective functions of, e.g., enlarging, reducing, moving the picture 10 on the screen.

Specifically, the large picture 10 of FIG. 1A is in a state of no GUI component but information 11 to be browsed, e.g., an online map or newspaper being displayed as picture data. Upon a user inputs indication of, e.g., displaying the GUI component 14 or 16, the state of FIG. 1A may be changed into a state of FIG. 1B or 1C. In FIG. 1B, the GUI component 14 is displayed on the right side of the picture 10. In FIG. 1C, the GUI component 16 is displayed such that it is superimposed upon the picture 10 (the picture data 11). In addition, on the picture 10, reference numeral 12 denotes a pointer used for indicating a position of a pointing device such as the mouse or the like.

If the picture data 11 is, e.g.,man electrical document made up of HyperText Markup Language (HTML) and disclosed in a Japanese Laid-open Patent Application No. 10-273822, then the picture data 11 can be displayed in three-dimension while being zoomed in/out, and information 11-1 or 11-2 linked therein can be opened one on top of the other as shown in FIGS. 1A through 1C.

However, the conventional GUI display suffers from the following disadvantages.

In the case of using the GUI component 14 to operate the large picture 10, if the GUI component 14 is displayed on the side of the picture 10, the pointer 12 for operating the GUI component 14 needs to be moved thereto as shown in FIG. 1B. Since the GUI component 14 is relatively far from the information 11-1 to be operated on the picture 10, the user has to repeatedly move both of his/her eyes and the pointer 12 therebetween. Further, since the GUI component 14 occupies part of the picture 10, there brings about a problem that an operation region of the picture 10 is reduced as a whole.

On the other hand, in the case of using the GUI component 16 to operate the picture 10, as shown in FIG. 1C, since the GUI component 16 is superimposed on the picture 10, part of the picture 10 is covered by the GUI component 16. As a result, the user cannot see the part covered by the GUI component 16, but the part can be seen only when the GUI component 14 is moved to another place or non-displayed. Also, it can be considered that the GUI component 16 may disappear immediately after operation thereof is completed. However, the GUI component 16 needs to be displayed whenever it is to be used. As a result, it is inconvenient for the user to continually operate the GUI component 16.

SUMMARY OF THE INVENTION

It is a general object of the present invention to provide a graphic user interface display and a recording medium including a. computerized method recorded therein for operating the graphic user interface display, in which the above disadvantages can be eliminated.

Another and a more specific object of the present invention is to provide a graphic user interface display with good operation and without interfering with other pictures displayed on one screen.

Still another object of the present invention is to provide a recording medium including a computerized method recorded therein for operating such a graphic user interface display.

The above objects and other objects of the present invention are achieved by a graphic user interface display capable of displaying a graphic user interface on a picture. The graphic user interface display comprises a display-indication determining unit determining whether display indication is inputted, a transparency table including preset transparencies of the graphic user interface displayed according to the display indication, and a processing unit adjusting the graphic user interface according to the transparency table so as to display the graphic user interface.

The above objects and other objects of the present invention are achieved by a graphic user interface display capable of displaying a graphic user interface, corresponding to a process of a computer, on a picture of the computer. The graphic user interface display comprises a display-indication determining unit determining whether display indication is inputted, a position detecting unit detecting a position of a pointer on the picture, and a processing unit adjusting a transparency of the graphic user interface based on the position detected by the position detecting unit so as to display the graphic user interface.

The above objects and other objects of the present invention are achieved by a graphic user interface display capable of displaying a graphic user interface, corresponding to a process of a computer, on a picture of the computer. The graphic user interface display comprises a position varying unit varying a position where the graphic user interface is displayed on the picture according to a position of a pointer on the picture, when the position of the pointer is varied due to the process of the computer.

The above objects and other objects of the present invention are achieved by a recording medium including a computerized method recorded therein for realizing a graphic user interface display:capable of displaying a graphic user interface on a picture of a computer, the computerized method comprising the steps of determining whether indication of displaying the graphic user interface is inputted, providing a transparency table including predetermined transparencies of the graphic user interface to be displayed according to the indication and reading the transparencies out of the transparency table, and adjusting and displaying the graphic user interface according to the predetermined transparencies.

The above objects and other objects of the present invention are achieved by a recording medium having a computerized method recorded therein for realizing a graphic user interface display capable of displaying a graphic user interface on a picture of a computer, the computerized method comprising the steps of determining whether indication of displaying the graphic user interface is inputted, detecting a position of a pointer on the picture, and adjusting a transparency of the graphic user interface based on the position detected at the detecting step and displaying the graphic user interface.

The above objects and other objects of the present invention are achieved by a recording medium having a computerized method recorded therein for realizing a graphic user interface display capable of displaying a graphic user interface on a picture during a process of a computer, the computerized method comprising the step of varying a position where the graphic user interface is displayed on the picture according to a position where a pointer is displayed, when the position of the pointer is varied due to the process.

The above objects and other objects of the present invention are achieved by a method of presenting an electrical document on a screen of a display. The method comprising the step of displaying the electrical document to a user such that the electrical document can be moved and zoomed in/out on the screen, displaying a GUI mark for moving and zooming in/out the electrical document and an indication mark for indicating the GUI mark, and causing the GUI mark to be varied in response to at least one of three variables: a position where the GUI mark is displayed, a distance between the GUI mark and the indication mark, and an elapsed time after the electrical document is moved or zoomed in/out by the GUI mark.

Other objects, features and advantages of the present invention will become more apparent from the following detailed description when read in conjunction with the accompanying drawings.

DETAILED DESCRIPTION OF THE PREFERRED EMBODIMENTS

With reference to the drawings, a description will be given below of a preferred embodiment of the present invention.

Figure 1A:
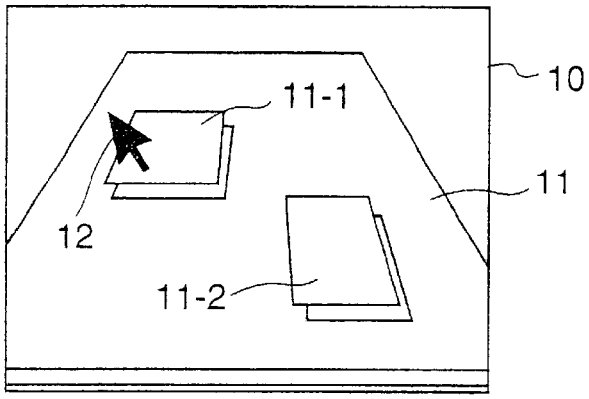
FIGS. 1A through 1C are diagrams illustrating a conventional GUI display in,which GUI components are displayed on a picture of a screen (not shown) of a computer.
Figure 1B:
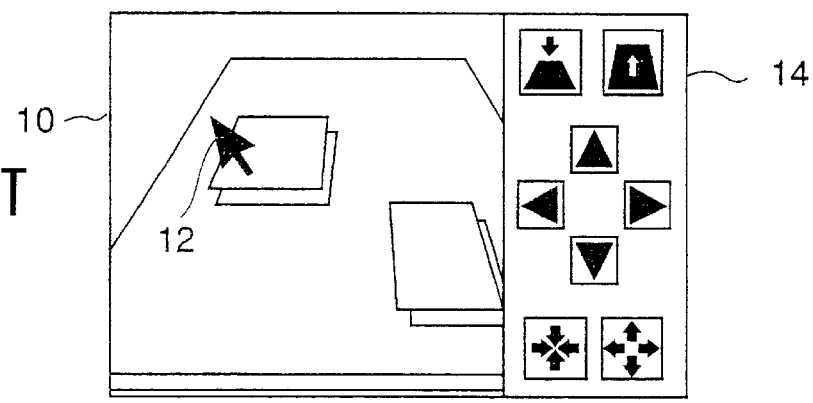
Figure 1C:
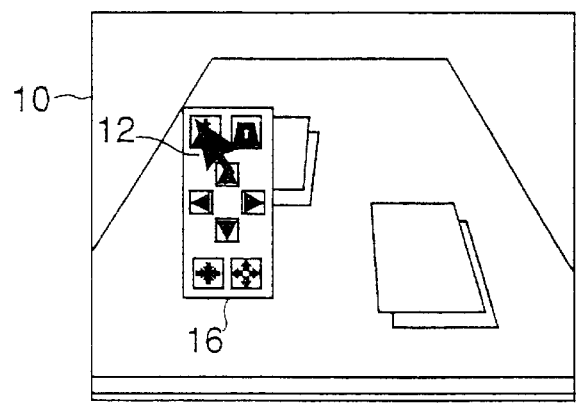
Figure 2:
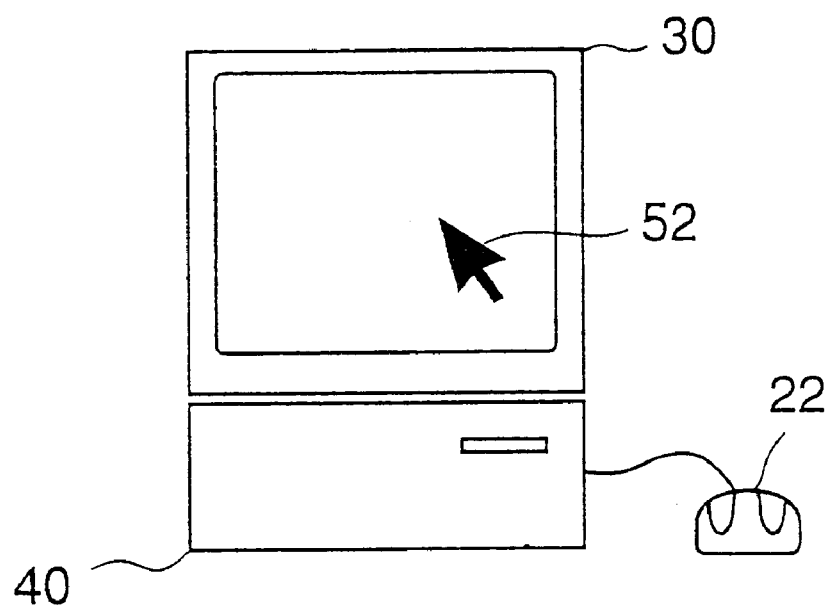
FIG. 2 is a diagram showing the computer by means of which a GUI display in accordance with the present invention can be realized.

FIG. 2 is a diagram showing a computer 1 capable of realizing a GUI display in accordance with the present invention. As shown in this diagram, the computer 1 includes a pointing device 22, e.g., a mouse, a display device 30, and a computer main body 40. The display device 30 has a screen on which a pointer (indicating mark) 52 is displayed thereon and is movable according to operation of the pointing device 22.

In a case where such a computer 1 is designed as a browsing machine for the use of a family, the display device 30 is usually separated from the computer main body 40, employing a plasma display with a large screen of 50 inches also serving as a TV set. Also, the pointing device 22 may be separated from the display device 30, remotely operating the GUI display by sending signals wirelessly or in an infrared way.

Figure 3:
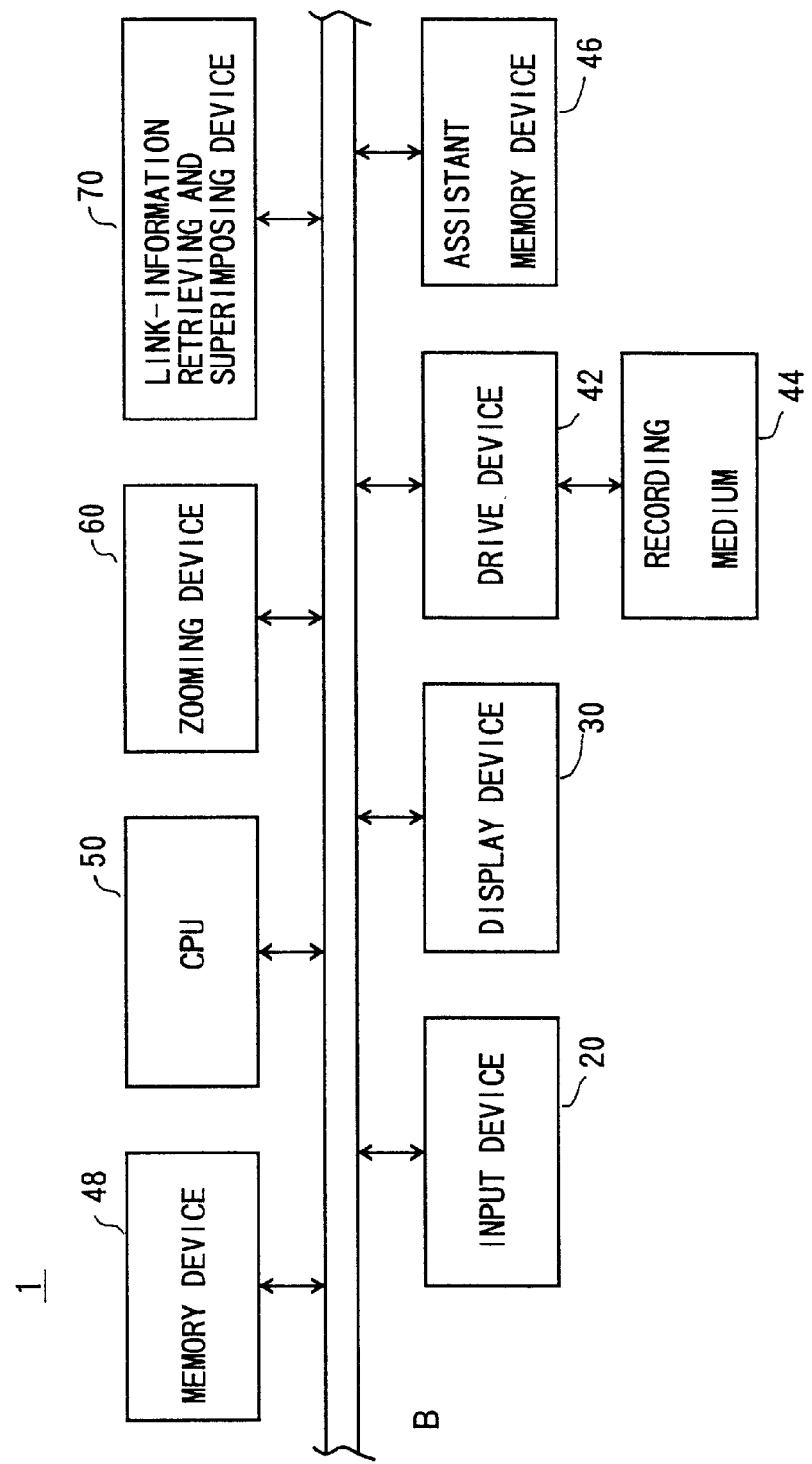
FIG. 3 is a diagram showing a hardware configuration of the computer of FIG. 2.

FIG. 3 is a diagram showing a hardware configuration of the computer 1 of FIG. 2. The GUI may be regarded as a kind of user-friendly interface which employs a plurality of small icons (hereinafter referred to as GUI components) displayed on the screen to represent various kinds of commands and functions for operating the computer 1 so as to make them understood intuitively. Also, the GUI display performs a process of displaying the GUI components on pictures of the screen of the display device 30 in response to user's indication.

As shown in FIG. 3, the computer 1 includes an input device 20, a drive device 42, a recording medium 44, an assistant memory device 46, a memory device 48 and a CPU 50 as well as the display device 30, these parts being coupled to a bus line B.

Also, picture data of a picture to be displayed on the screen may be, e.g., obtained from the Internet or formed separately, and stored in the assistant memory device 46. The picture data may be displayed-in the picture by the display device 30 in three-dimension as, e.g., an electrical HTML document.

The computer 1 further includes a zooming device 60 for zooming in and out, e.g., the picture and a link-information retrieving and superimposing device 70 for retrieving various kinds of information linked in the picture data (the electrical HTML document) and causing the retrieved link-information to be superimposed one on top of another.

The input device 20 includes the pointing device 22 such as a keyboard, a mouse or the like which may be operated by the user and through which various operation signals can be inputted into the computer 1. Also, the pointer 52 displayed on a picture of the display device 30 may be moved thereon according to the operation of the pointing device 22. Besides showing the user, e.g., the above-mentioned picture data, the display device 30 may display various kinds of windows, data, the GUI components and the pointer 52, which are necessary for the user to operate the computer 1.

Programs for the GUI display may be installed into the computer 1 from the recording medium 44, which may be a CD-ROM or the like. The recording medium 44, where the programs for the GUI display are stored, is inserted into the drive device 42 by which the programs are transferred to the assistant memory device 46 therefrom.

The assistant memory device 46 is used to store the programs for the GUI display as well as necessary files and data. When the computer 1 starts to operate or the GUI display is used, the memory device 48 reads the programs for the GUI display out of the assistant memory device 46 and stores them therein. The CPU 50 performs a process of realizing the GUI display according to the programs stored in the memory device 48.

The above-mentioned programs for the GUI display may be executed such that the programs installed in the assistant memory device 46 are read out thereof and stored into the memory device 48 and then executed by the CPU 50 according to procedure shown in FIG. 4 through FIG. 17.

Figure 4:
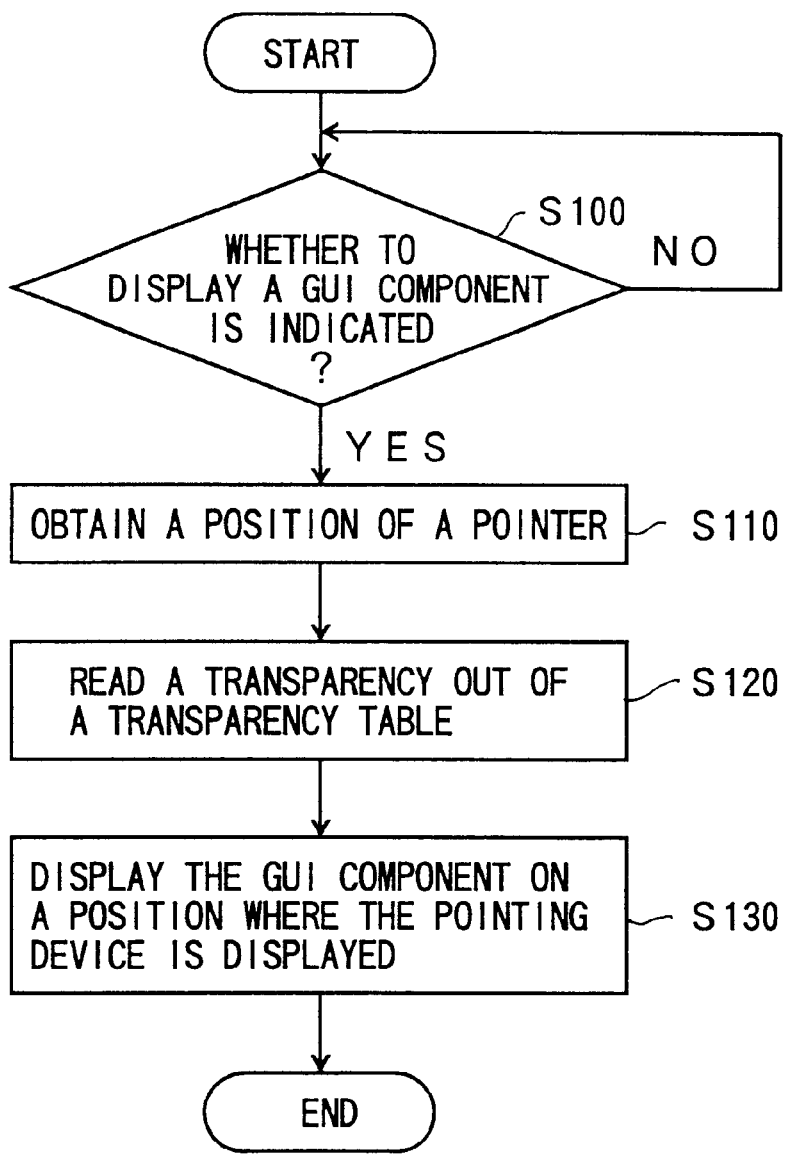
FIG. 4 is a flowchart illustrating procedure for operating the computer to realize a GUI display according to a first embodiment of the present invention.

FIG. 4 is a flowchart illustrating procedure for operating the computer 1 to realize the GUI display according to a first embodiment of the present invention.

As shown in this flowchart, at Step 100 (S100), a determination is made whether the pointing device, e.g., the mouse 22 indicates to display GUI components. If YES, the CPU 50 operates to perform a process of displaying these GUI components.

Then, the procedure goes to Step,110 (S110). At Step 110, as the process of displaying the GUI components starts, the CPU 50 detects a position of the pointer 52 displayed on the display device 30 and stores the position in the memory device 48.

At Step 120 (S120), the CPU 50 reads transparencies, with which the GUI components are displayed, out of a transparency table stored in the memory device 48 or the assistant memory device 46. The transparency table encompasses the transparencies, which may be determined by the user in advance, of the GUI components.

Next, at Step 130 (S130), the CPU 50 causes the GUI components, which have been adjusted according to the predetermined transparencies, to be displayed close to the position of the pointer 52 read out of the memory device 48. For example, a GUI component 54 adjusted according to the transparency table may be displayed on a picture of the display device 30 as shown in FIG. 5.

Figure 5:
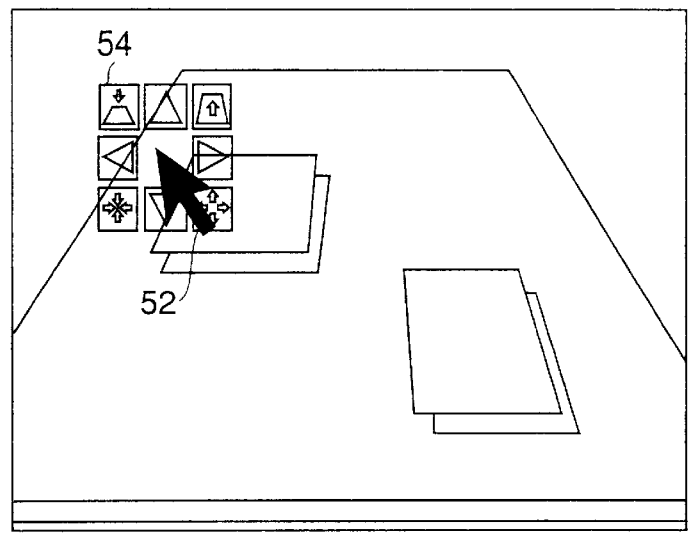
FIG. 5 is a diagram showing an example of the GUI component displayed by a display device according to the first embodiment.

FIG. 5 is a diagram showing the GUI component 54 displayed on the picture of the display device 30 according to the first embodiment.

Figure 6:
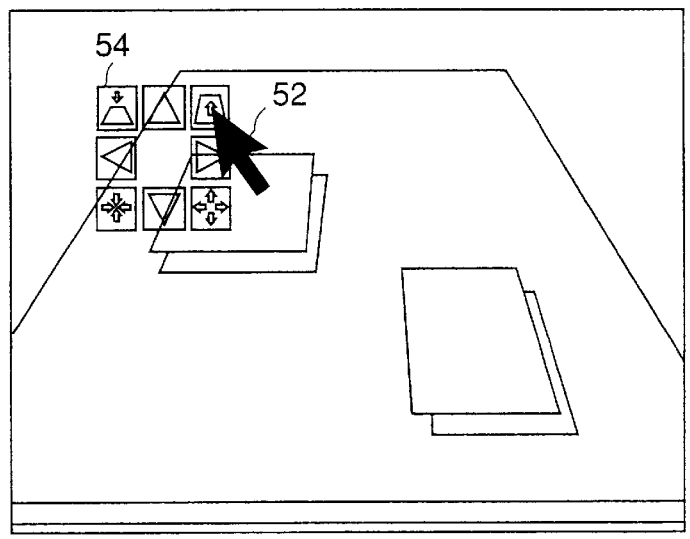
FIG. 6 is a diagram showing another example of the GUI component displayed on the display device according to the first embodiment.

As shown in this diagram, the GUI component 54 whose transparency has been adjusted is displayed on a place where the pointer 52 is positioned. Thus, the pointer 52 becomes able to operate the GUI component 54 without large movement as shown in FIG. 6. Further, since the GUI component 54 can be adjusted to become half-transparent, the picture can have part thereof blocked by the GUI component 54 to be recognized by the user. As a result, the user can be in control of the whole picture even though the GUI component 54 is superimposed thereon.

Figure 7:
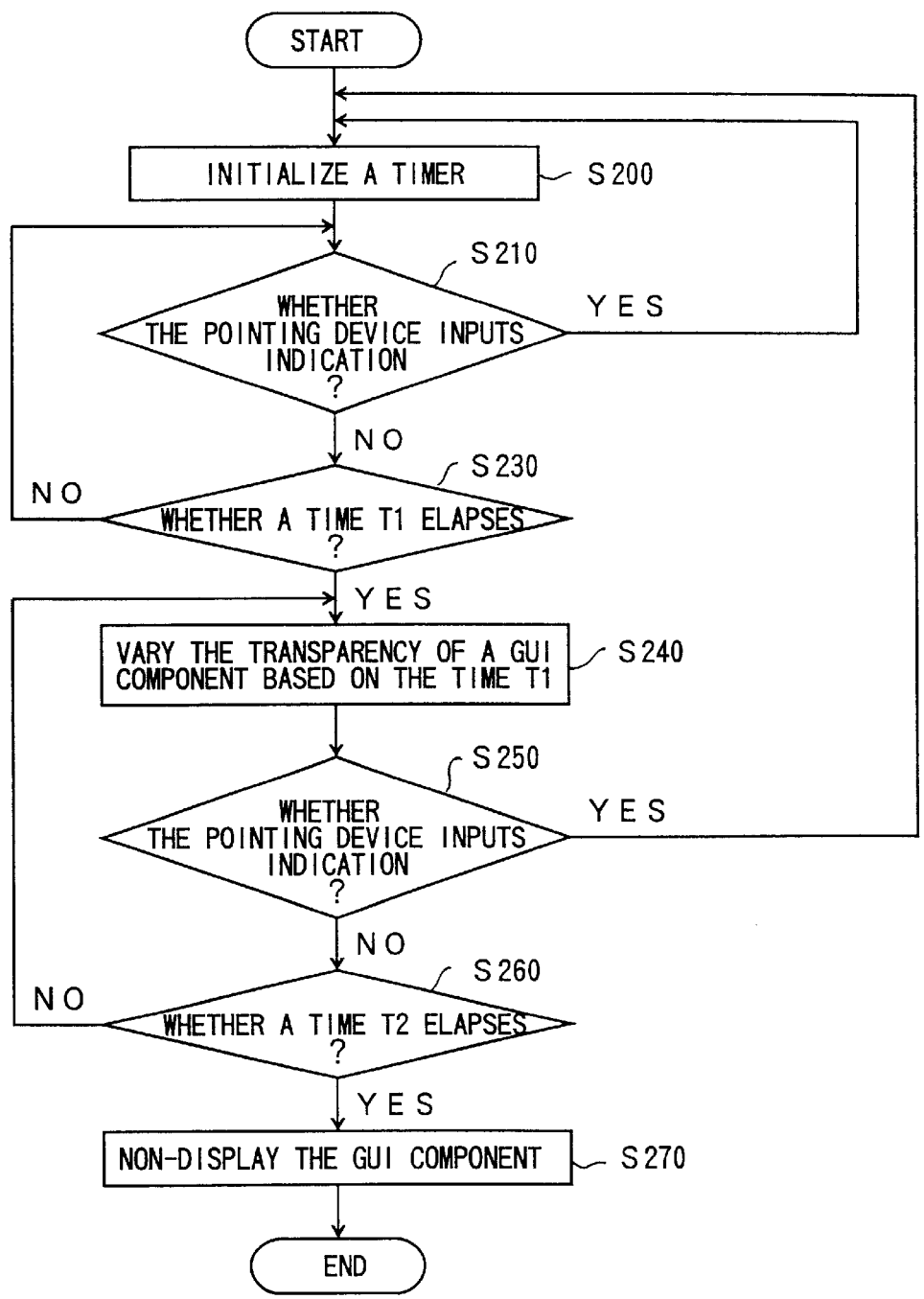
FIG. 7 is a flowchart illustrating procedure for operating the computer to realize a GUI display according to a second embodiment of the present invention.

FIG. 7 is a flowchart illustrating procedure for operating the computer 1 to realize the GUI display according to a second embodiment of the present invention.

As shown in this flowchart, at Step 200 (S200), the CPU 50 causes a timer to be initialized after the GUI component 54 is displayed on the picture. In this embodiment, the timer may be a reference clock of the computer 1 or a hardware component added to the computer 1.

At Step 210 (S210), a determination is made whether input related to the GUI component 54 is performed by the pointing device 52. If no such input is performed, that is, if NO, then the procedure goes to Step 230.

At Step 230, the CPU 50 confirms the timer whether a time T1 elapses. If the timer indicates that the time T1 has elapsed, that is, if YES, the procedure goes to Step 240.

At Step 240, the CPU 50 causes the transparency of the GUI component 54 to be changed according to the elapsed time T1 indicated by the timer.

At Step 250, a determination is made whether the input related to the GUI component 54 is performed by the pointing device 52. If no such input is performed, that is, if NO, the procedure goes to Step 260.

At Step 260, the CPU 50 confirms the timer whether a time T2 elapses. If the timer indicates that the time T2 has elapsed, that is, if YES, the procedure goes to Step 270.

At Step 270, the CPU 50 switches to non-display of the GUI component 54.

Also, at Step 210 and Step 250, if the input related to the GUI component 54 is performed by the pointing device 52, that is, if YES, the procedure in both the steps goes to Step 260 where the timer is initialized.

Also, at Step 230, if the CPU 50 confirms the timer and detects that the timer T1 has not elapsed, that is, if NO, the procedure goes back to Step 210 where the determination is made whether the input related to the GUI component 54 is performed by the pointing device 22.

Also, at Step 260, if the CPU 50 confirms the timer and detects that the timer T2 has not elapsed, that is, if NO, the procedure goes back to Step 240 where the transparency of the GUI, component 54 is adjusted according to the elapsed time T2.

Figure 8A:
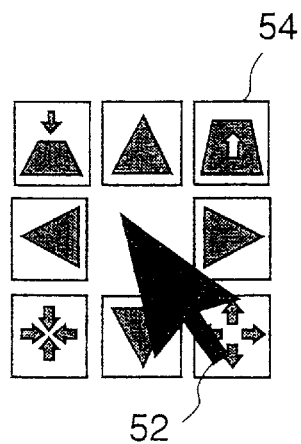
FIGS. 8A through 8C are diagrams, illustrating variations in transparency of the GUI component according to the procedure of FIG. 7.
Figure 8B:
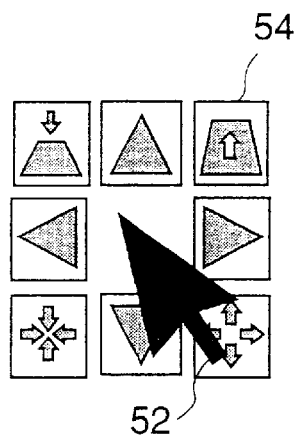
Figure 8C:
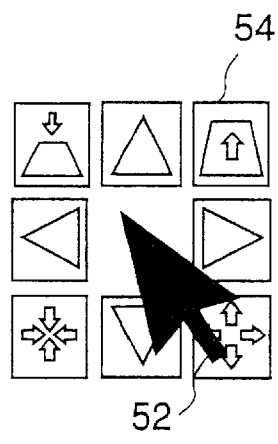

If the input related to the GUI component 54 is not continuously performed by the pointing device 22, as shown in FIGS. 8A through 8C, the transparency of the GUI component 54 can be increased stepwise, and finally the GUI component 54 can go to disappear. In addition, FIGS. 8A through 8C are diagrams illustrating variations in the transparency of the GUI component 54 according to the procedure of FIG. 7.

As shown in these diagrams, the transparency of the GUI component 54 is increased stepwise in order of FIG. 8A, FIG. 8B and FIG. 8C. In addition, the transparency, the time T1 and the time T2 may be designed to be adjustable to suit user's own convenience.

Figure 9:
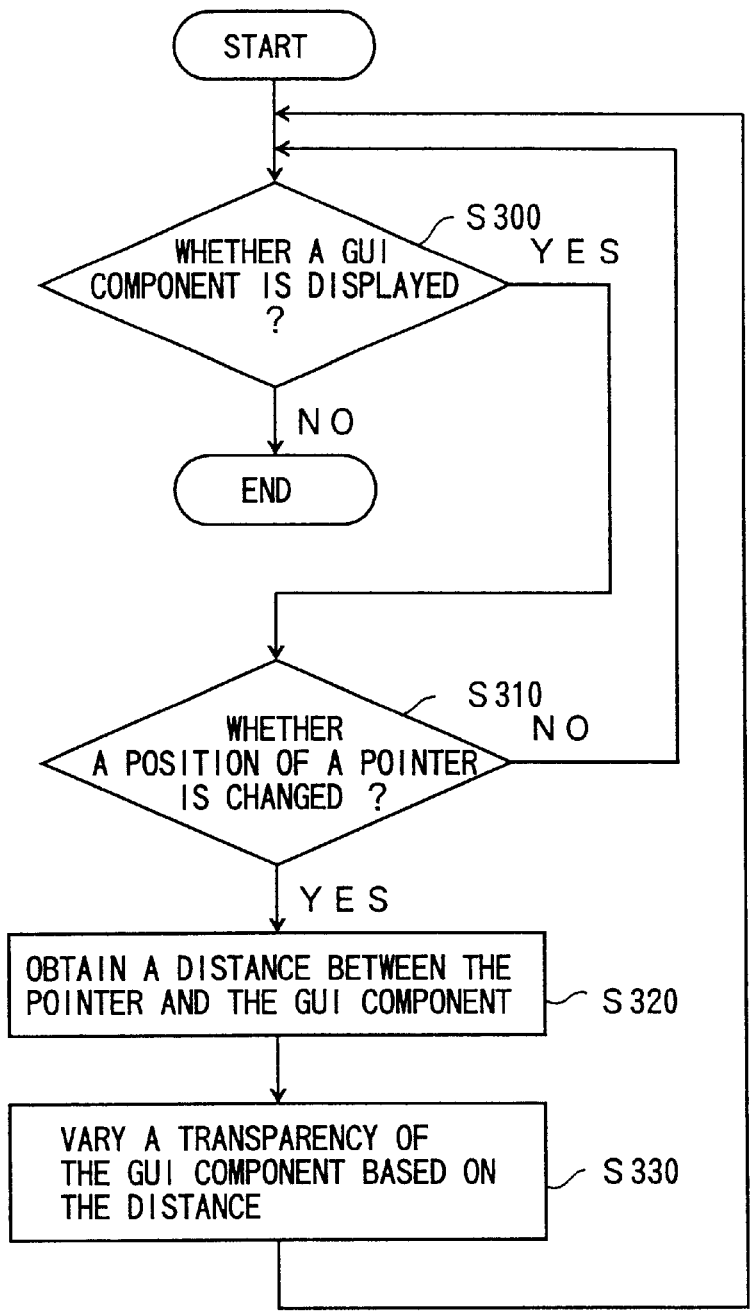
FIG. 9 is a flowchart illustrating procedure for operating the computer to realize a GUI display according to a third embodiment of the present invention.

FIG. 9 is a flowchart illustrating procedure for operating the computer 1 to realize the GUI display according to a third embodiment of the present invention.

As shown in this flowchart, at Step 300 (S300), the CPU 50 makes a decision of whether the GUI component 54 is displayed on the display device 30. If YES, that is, the GUI component 54 is displayed thereon, the procedure goes to Step 310.

At Step 310, the CPU 50 makes a decision of whether a position where the pointer 52 is displayed is changed. If YES, that is, the position is changed, the procedure goes to Step 320.

At Step 320, the CPU 50 calculates a distance between the GUI component 54 and the pointer 52. And then the procedure goes to Step 330.

At Step 330, the CPU 50 causes the GUI component 54 to be adjusted in transparency again according to the distance calculated at Step 320, so as to display it on the display device 30 as shown in FIG. 10.

Figure 10A:
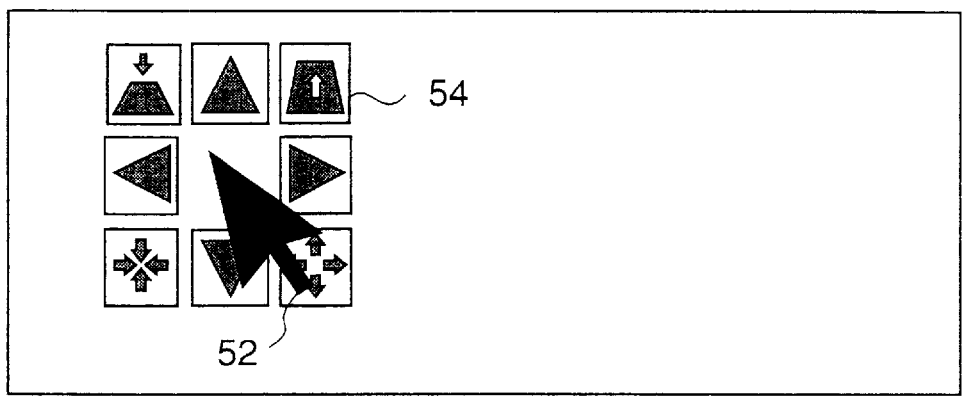
FIGS. 10A through 10C are diagrams illustrating variations in the transparency of the GUI component according to the procedure of FIG. 9.
Figure 10B:
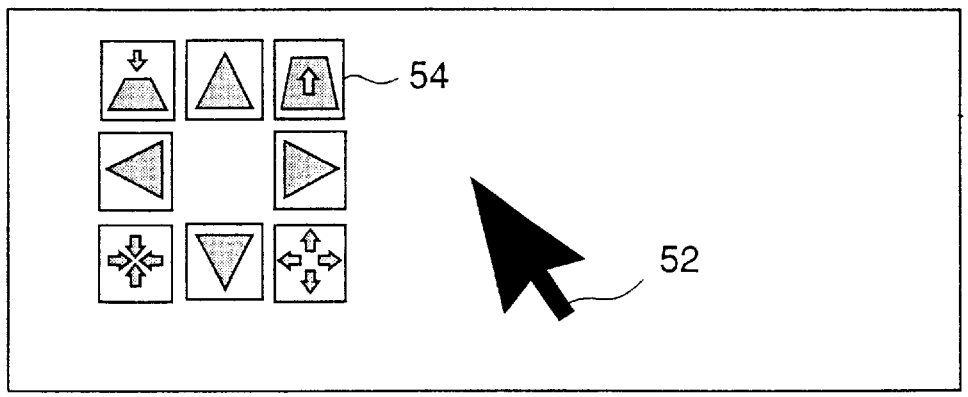
Figure 10C:
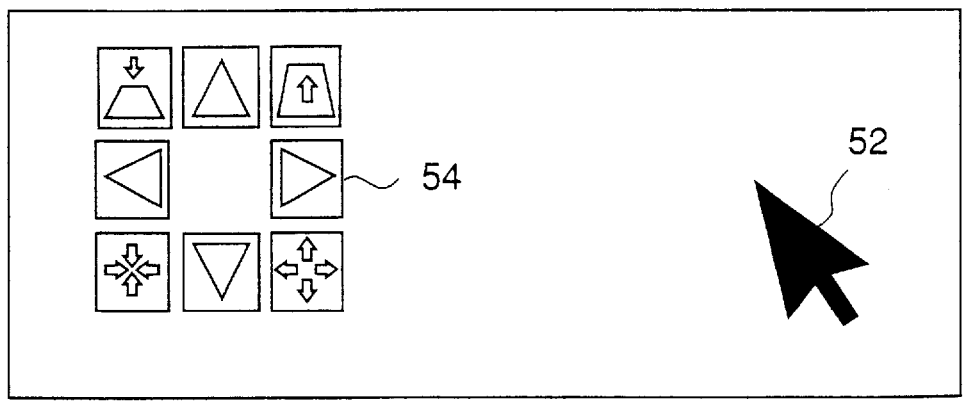

FIGS. 10A through 10C are diagrams illustrating variations in the degree of the transparency of the GUI component 54 according to the procedure of FIG. 9.

As shown in FIG. 10A where the pointer 52 is close to the GUI component 54, it can be considered that there is a relatively high possibility of operating the GUI component 54 and therefore the GUI component 54 has its transparency reduced until it conspicuous.

As shown in FIG. 10C where the pointer 52 is far from the GUI component 54, it can be considered that there is a relatively low possibility of operating the GUI component 54 and therefore the GUI component 54 has its transparency increased until it inconspicuous.

Accordingly, while the user has a high possibility of operating other than the GUI component 54, the GUI component 54 has its transparency increased to a level at which the GUI component 54 becomes inconspicuous. As a result, the whole picture of the display device 130 becomes easy to observe.

Also, at Step 300 of FIG. 9, if the GUI component 54 is not displayed on the display device 30, that is, if NO, the procedure is completed.

Also, at Step 310, if the position of the pointer 52 is not changed, that is, if NO, the procedure goes back to Step 300 where the decision is made of whether the GUI component 54,is displayed on the display device 30.

Figure 11:
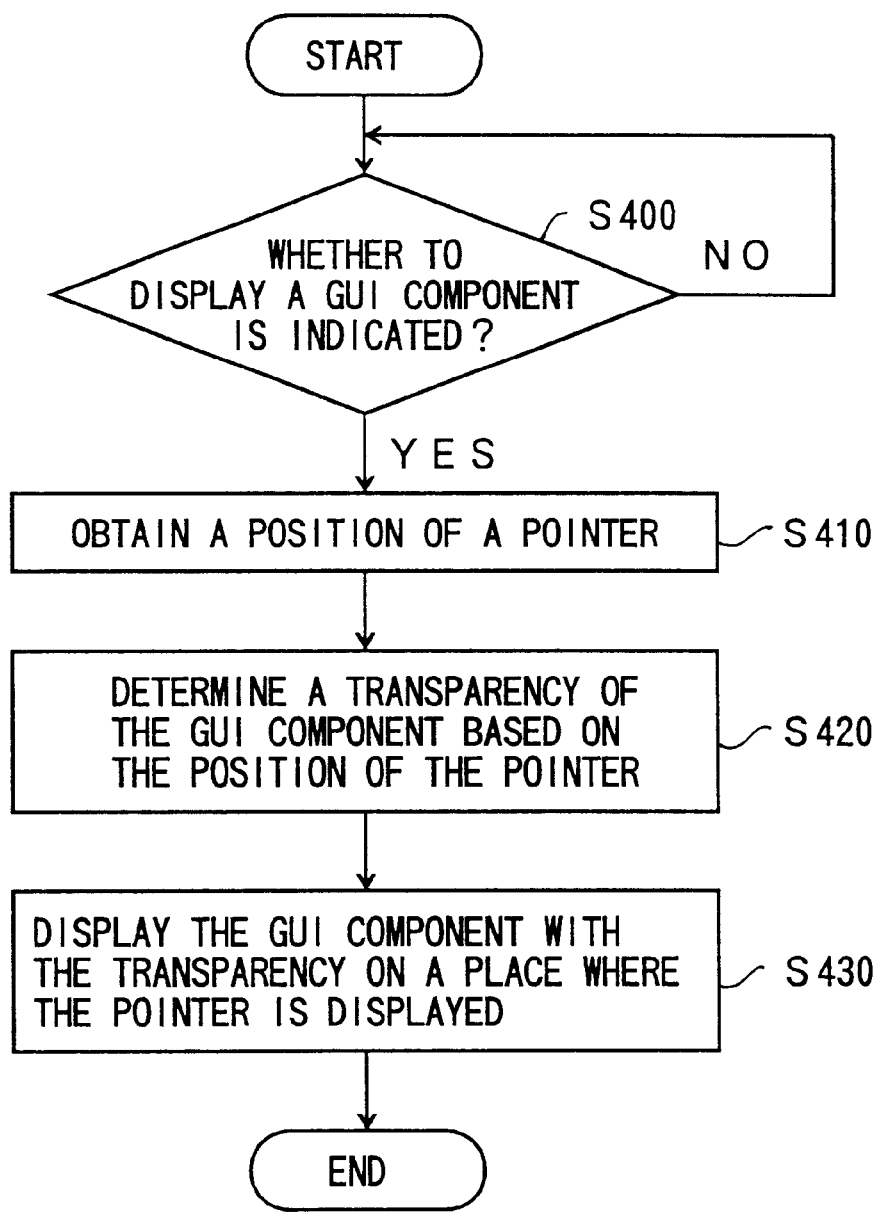
FIG. 11 is a flowchart illustrating procedure for operating the computer to realize a GUI display according to a fourth embodiment of the present invention.

FIG. 11 is a flowchart illustrating procedure for operating the computer 1 to realize the GUI display according to a fourth embodiment of the present invention.

As shown in this flowchart, at Step 400 (S400), a determination is made whether the pointing device 22 inputs indication of displaying the GUI component 54. If the GUI component 54 is displayed, that is, if YES, then the CPU 50 starts the process of displaying the GUI component 54 and the procedure goes to Step 410.

At Step 410, as the process of displaying the GUI component 54 starts, the CPU 50 detects a position of the pointer 52 displayed on a picture of the display device 30 and stores the position in the memory device 48.

At Step 420, the CPU 50 determines the transparency of the GUI component 54 according to the position of the pointer 52 read out of the memory device 48 such that, e.g., the GUI component 54 has its transparency increased if the pointer 52 is positioned close to the center of the picture but reduced if it is positioned on the side of the picture.

Figure 12A:
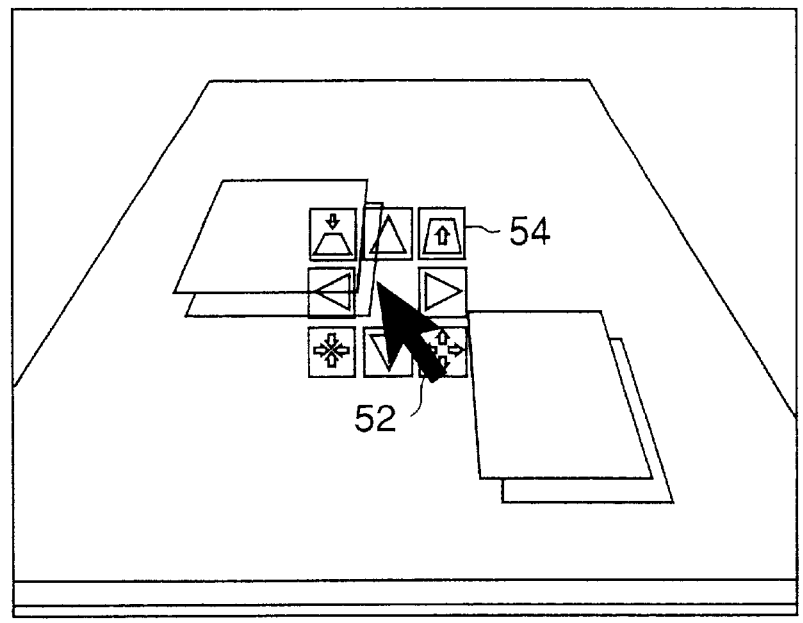
FIGS. 12A and 12B are diagrams illustrating variations in the transparency of the GUI component according to the procedure of FIG. 11.
Figure 12B:
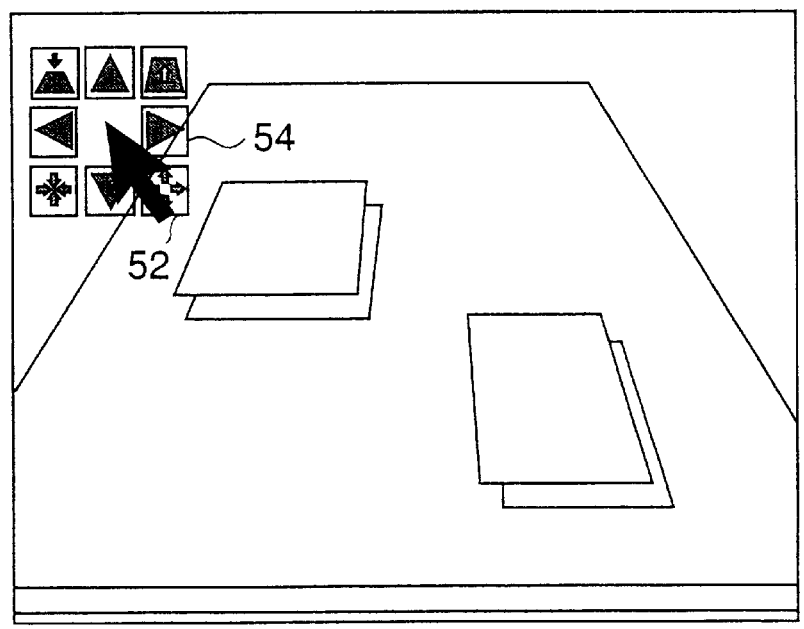

Next, as Step 430, the CPU 50 adjusts the GUI component 54 according to the transparency determined at Step 420 based on the position of the pointing device 22, and displays the GUI component 54 on the picture of the display device 301 as shown in FIGS. 12A and 12B.

FIGS. 12A and 12B are diagrams illustrating variations in the degree of the transparency according to the procedure of FIG. 11.

For example, as shown in FIG. 12A where the GUI component 54 is positioned close to the center of the screen, the GUI component 54 has its transparency increased until it becomes inconspicuous. On the other hand, as shown in FIG. 12B where the GUI component 54 is positioned on the side thereof, the GUI component 54 has its transparency reduced until it becomes conspicuous.

As a result, by adjusting the transparency of the GUI component 54 in response to the position where it is displayed, the whole picture can become easy to observe and the operation of the GUI component 54 can be improved.

Figure 13:
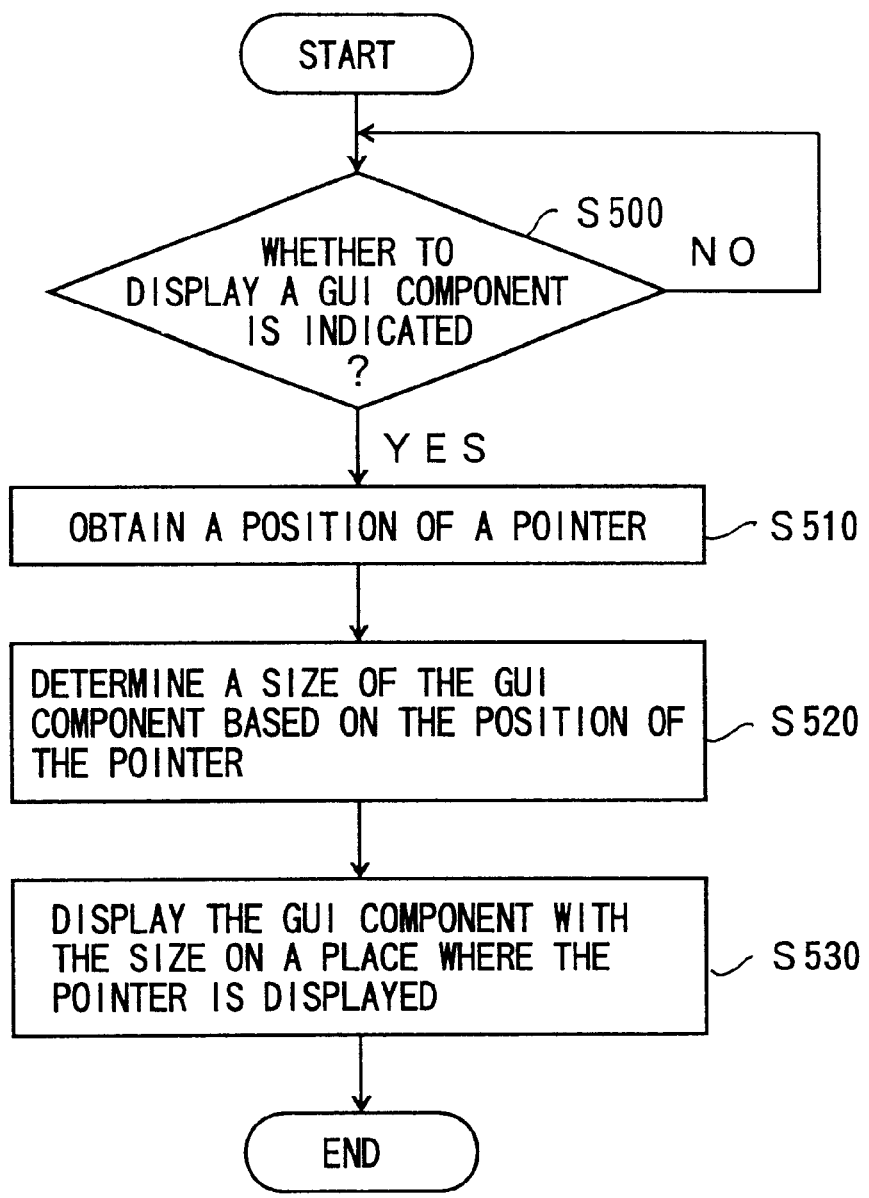
FIG. 13 is a flowchart illustrating procedure for operating the computer to realize a GUI display according to a fifth embodiment of the present invention.

FIG. 13 is a flowchart illustrating procedure for operating the computer 1 to realize the GUI display according to a fifth embodiment of the present invention.

As shown in FIG. 13, at Step (S500), a decision is made of whether the GUI component 54 is displayed on a picture of the display device 30. If YES, that is, if the GUI component 54 is displayed thereon, then the procedure goes to Step (S510).

At Step 510, the CPU 50 reads a position of the pointer 52 out of the memory device 48, and then the procedure goes to Step 520 (S520).

At Step 520, the CPU 50 determines a size of the GUI component 54 according to the position of the pointer 52. For example, the GUI component 54 may be displayed relatively small if the pointer 52 is positioned close to the center of the picture, but relatively large if it is positioned On the side thereof.

Figure 14A:
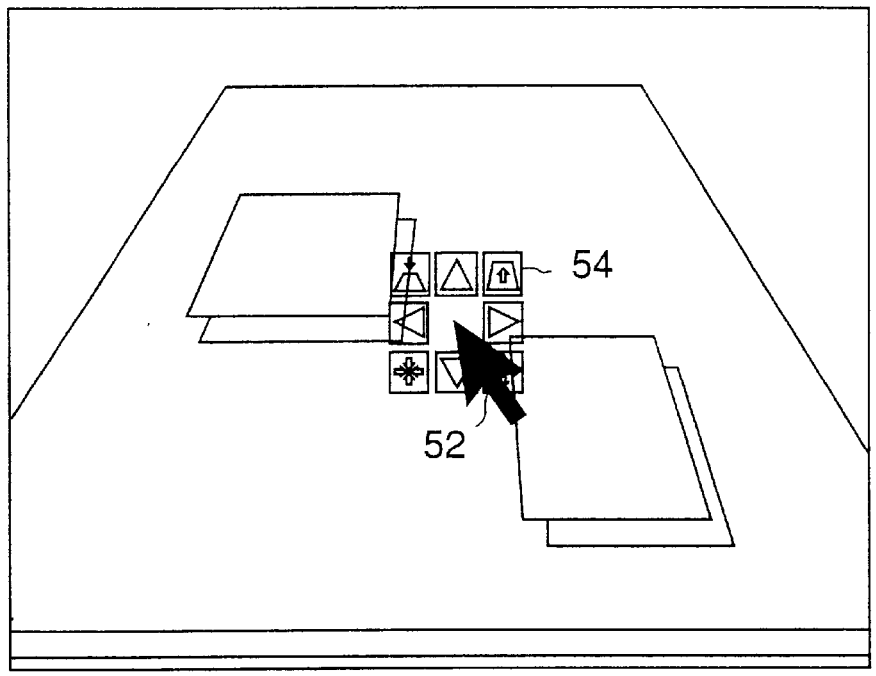
FIGS. 14A and 14B are diagrams illustrating variations in a size of the GUI component according to the procedure of FIG. 13.
Figure 14B:
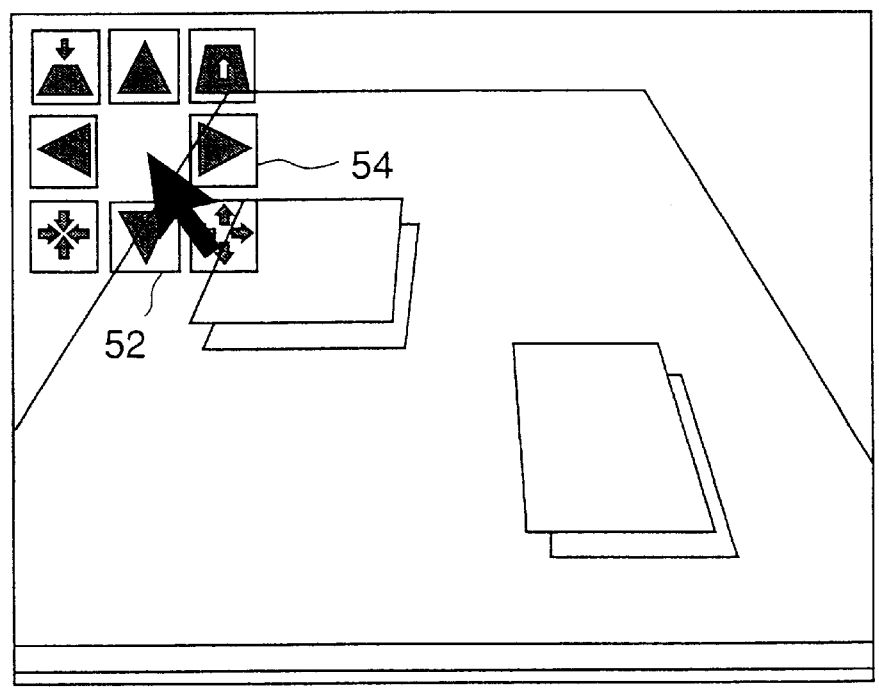

Then, as Step 530, the CPU 50 adjusts the GUI component 54 in size according to the determination of Step 520, so that the GUI component 54 can be displayed on the picture of the display device 30 as shown in FIGS. 14A and 14B.

FIGS. 14A and 14B are diagrams illustrating variations in the size of the GUI component 54 according to the procedure of FIG. 13.

For example, as shown in FIG. 14A, since the GUI component 54 is displayed near to the center of the picture, the GUI component 54 has its size to be adjusted relatively small so that it can become inconspicuous. On the other hand, as shown in FIG. 14B, since the GUI component 54 is displayed on the side of the picture, the GUI component 54 has its size to be adjusted relatively large so that it can become conspicuous.

As a result, by adjusting the size of the GUI component 54 in response to a displayed position thereof, the whole picture can become easy to observe and the operation of the GUI component 54 can be improved.

In addition, as shown in FIG. 11 and FIG. 13, the process of adjusting the transparency or the size of the GUI component 54 in response to the displayed position thereof, is also applicable to the flowchart of FIG. 7. For example, by adjusting the times T1 and T2 in response to the displayed position of the GUI component 54, the more the GUI component 54 is displayed close to the center of the picture, the quicker it disappears.

Figure 15A:
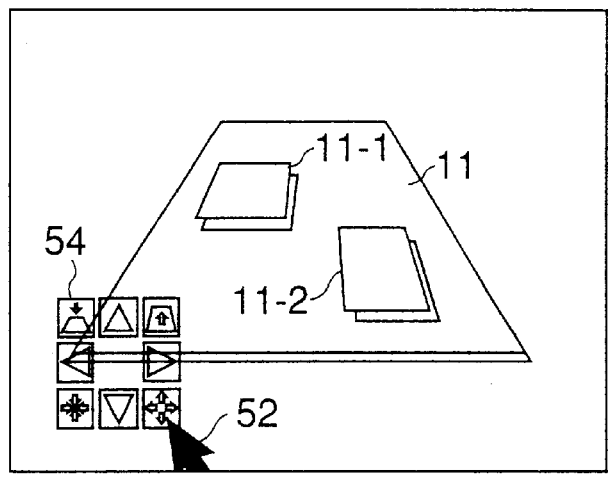
FIGS. 15A through 15C are diagrams illustrating how a pointer is moved with respect to the GUI component.
Figure 15B:
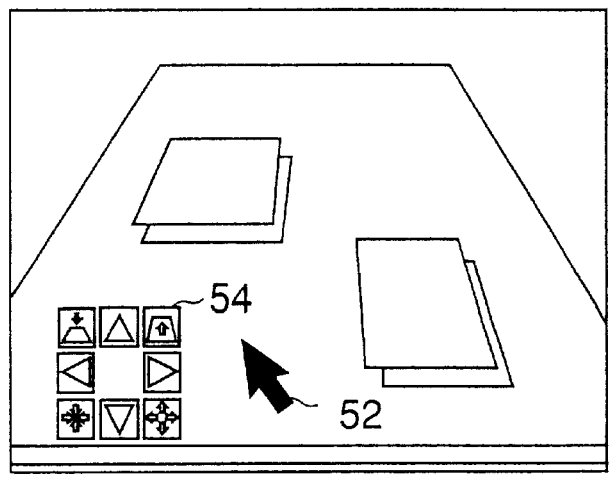
Figure 15C:
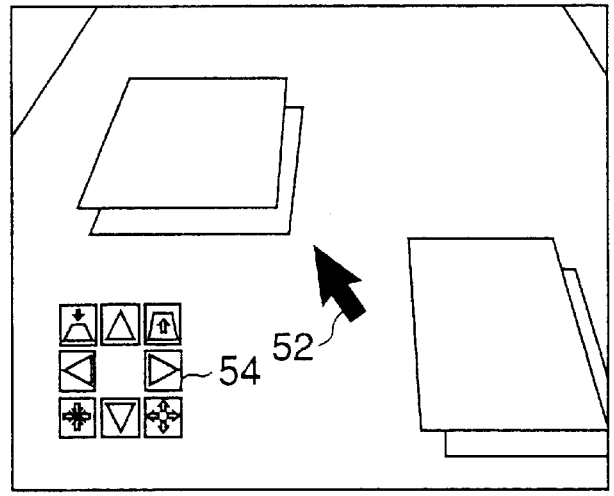

FIGS. 15A through 15C are diagrams illustrating movement of the pointer 52 on a picture. As can be seen from these diagrams, there exists a disadvantage in that the pointer 52 may move automatically, irrespective of operation of the pointing device 22, due to a process, e.g., zooming operation performed by the computer 1.

Specifically, the picture encompasses the picture data 11, e.g., the electrical document (e.g., a newspaper account) with the HTML structure disclosed in the Japanese Laid-open Patent Application No. 10-273822. The electrical document 11 is shown such that it is arranged in a three-dimensional virtual space in the picture and the link-information 11-1 and 11-2 linked therein can be magnified into separate pictures.

While the separate pictures 11-1 and 11-2 are further magnified and moved toward the center of the picture, the picture data 11 may gradually fade away. That is, by operating a magnifying mark of the GUI component 54, the picture data 11 of FIG. 15A can be zoomed in so as to appear as shown in FIG. 15B and FIG. 15C. In this case, the pointer 52 appears on the GUI component 54 at first as shown in FIG. 15A, and then moves automatically during the zooming-in operation as shown in FIGS. 15B and 15C. As a result, the pointer 52 separated from the GUI component needs to be dragged back thereto again in a case of further performing the zooming-in operation.

Figure 16:
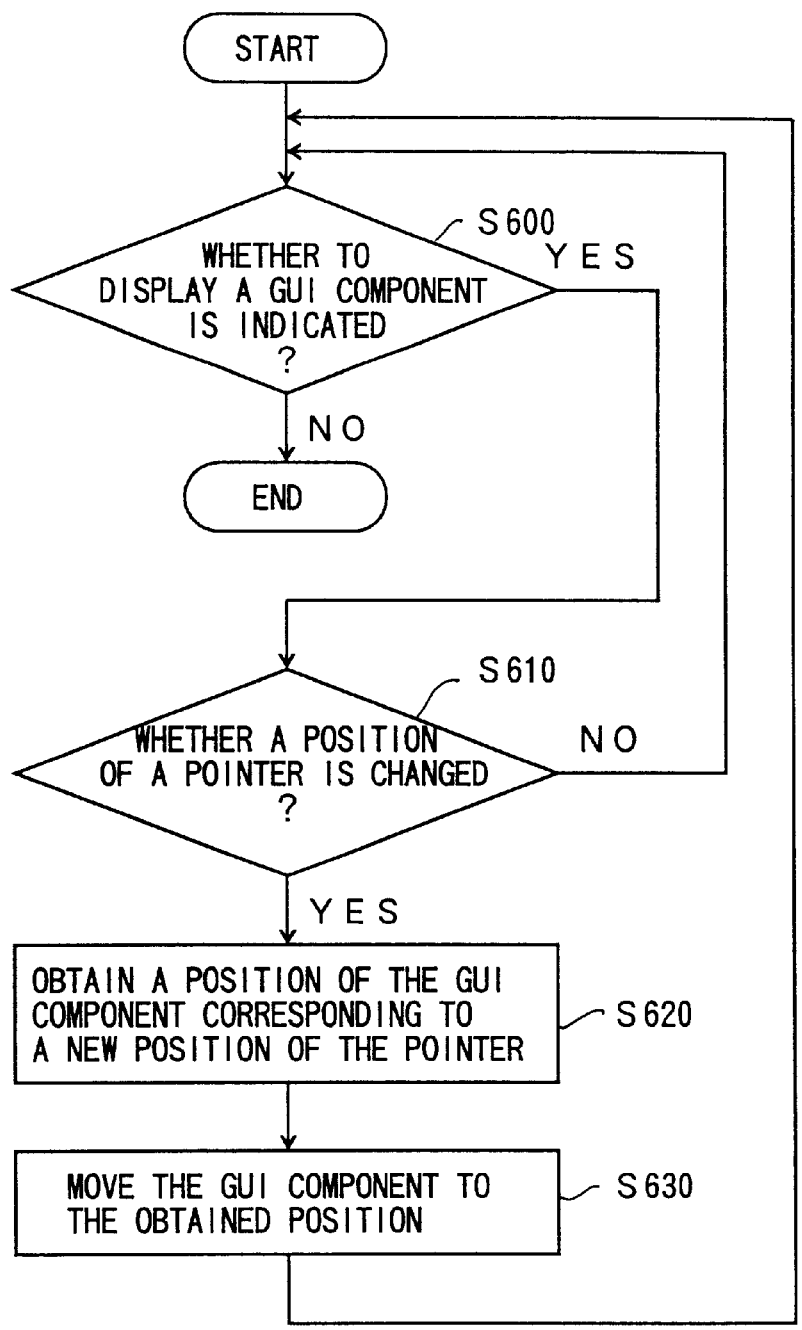
FIG. 16 is a flowchart illustrating procedure for operating the computer to realize a GUI display according to a sixth embodiment of the present invention.

The above-mentioned disadvantage can be eliminated by a flowchart of FIG. 16, which illustrates procedure for operating the computer to realize a GUI display according to a sixth, embodiment of the present invention.

As shown in FIG. 16, at Step 600. (S600), the CPU 50 makes a determination whether the GUI component 54 is displayed on the display device 30. If the GUI component 54 is displayed, that is, if YES, then the procedure goes to Step 610.

At Step 610, the CPU 50 makes a determination whether a position where the pointer 52 is displayed is changed due to a process performed by the computer 1. If the position of the pointer 52 is changed, that is, if YES, then the procedure goes to Step 620.

At Step 620, the CPU 50 determines a position to display the GUI component 54 according to the changed position of the pointer 52.

Figure 17A:
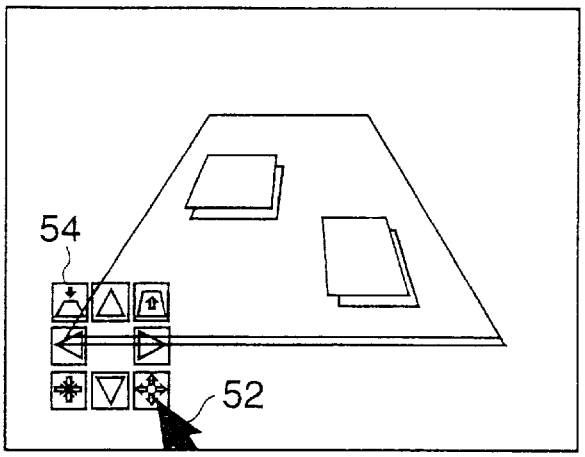
FIGS. 17A through 17C are diagrams illustrating movement of the GUI component according to the procedure of FIG. 16.
Figure 17B:
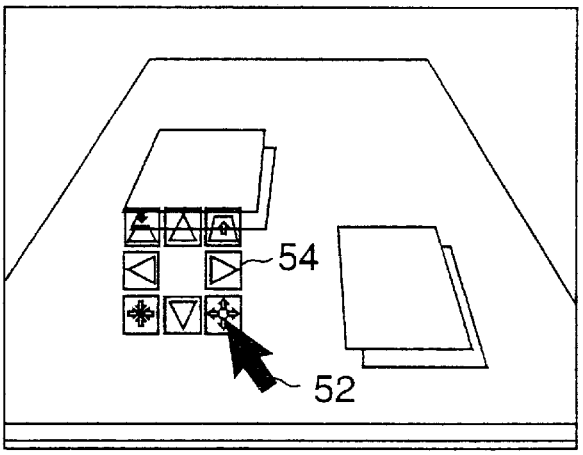
Figure 17C:
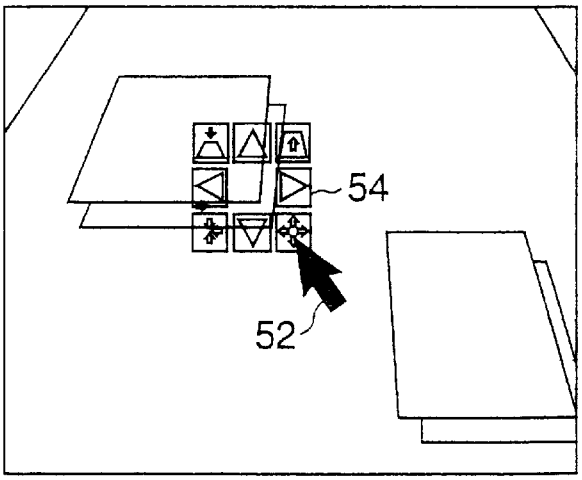

Then, at Step 630, the CPU 50 causes the GUI component 54 to be moved to the determined position thereof as shown in FIGS. 17A through 17C.

FIGS. 17A through 17C are diagrams illustrating the movement of the GUI display according to the procedure of FIG. 16.

These three diagrams show the same picture of performing the zooming-in operation as that of FIGS. 15A through 15C. By means of the zooming-in operation, the picture of FIG. 17A is changed into a form of FIG. 17B and further into a form of FIG. 17C.

As can be understood from FIGS. 17A through 17C, the pointer 52 is positioned on the GUI component 54 prior to the zooming-in operation as shown in FIG. 17A, and still on the GUI component 54 even after the zooming-in operation as shown in FIG. 17B. In other word, the position of the pointer 52 is kept unchanged with respect to the position of the GUI component 54 before and after the zooming-in operation. Accordingly, even the zooming-in operation is further performed for the picture of FIG. 17B, the position of the pointer 52 is not changed as shown in FIG. 17C.

In addition, referring back to FIG. 16, as Step 600, if the GUI component 54 is not displayed, that is if NO, the CPU 50 ends the procedure. Also, at Step 610, if the position of the pointer 52 is not changed based on the process of the computer 1, that is, if NO, the CPU 50 controls the procedure to repeat the Step 600, where the determination is made whether the GUI component 54 is displayed on the display device 30.

In addition, in the previously described embodiments, the process performed at step 100 may correspond to a display-indication determining unit, the process performed at step 110 to a detecting unit, the process performed at step 120 to a transparency table, the process performed at step 130 to a processing unit, the process performed at step 240 to a transparency changing unit, the process performed at step 330 to a second adjusting unit, and the process performed at step 620 to a position changing unit, in what is claimed.

The above description is provided in order to enable any person skilled in the art to make and use the invention and sets forth the best mode contemplated by the inventor for carrying out their invention.

Although the present invention has been described in terms of various embodiments, it is not intended that the invention be limited to these embodiments. It is easy to understand that the present invention can further take effect by combining the first embodiment through the sixth embodiment. For example, if the fourth and sixth embodiments are combined, the GUI component 54 can follow the movement of the pointer 52 and can also have its transparency and size to be adjusted in response to a position to which the GUI component 54 is moved. Modification within the spirit of the invention will be apparent to those skilled in the art.

The present application is based on Japanese priority application No. 11-259475 filed on Sep. 13, 1999, the entire contents of which are hereby incorporated by reference.

What is claimed is:

1. A graphical user interface display displaying a graphical user interface on a picture, the graphical user interface display comprising:

a display-indication determining unit determining whether display indication is input;

a transparency level table having preset levels of transparency of the graphical user interface displayed according to the display indication;

a processing unit adjusting the graphical user interface according to the transparency level table so as to display the graphical user interface;

a detecting unit detecting a position of a pointer on the picture;

a timing unit recording a time beginning with display of the graphical user interface;

a first adjusting unit adjusting a level of transparency of the graphical user interface based on the time recorded by the timing unit reaching a predetermined time without a user input; and a second adjusting unit adjusting a level of transparency of the graphical user interface based on a distance between the position of the pointer detected by the detecting unit and a position of the graphical user interface displayed on the picture by the processing unit.

2. The graphical user interface display as claimed in claim 1, wherein the first adjusting unit includes a transparency level varying part varying the level of transparency of the graphical user interface with each elapse of a plurality of predetermined times recorded in the timing unit.

3. A graphical user interface display displaying a graphical user interface, corresponding to a process of a computer, on a picture on a display of the computer, the graphical user interface display comprising:

a display-indication determining unit determining whether display indication is input;

a position detecting unit detecting a position of a pointer on the picture; and a processing unit increasing a level of transparency of the graphical user interface when the pointer is positioned at approximately a center of the picture, and decreasing the level of transparency of the graphical user interface when the pointer is positioned at a side of the picture.

4. The graphical user interface display, as claimed in claim 3, wherein the processing unit includes a first adjusting part adjusting a size of the graphical user interface-based on the position detected by the position detecting unit.

5. The graphical user interface display as claimed in claim 3, wherein the processing unit includes a second adjusting part adjusting the graphical user interface both in size and transparency based on the position detected by the position detecting unit.

6. A graphical user interface display displaying a graphical user interface, corresponding to a process of a computer, on a picture on a display of the computer, the graphical user interface display comprising:

a position varying unit varying, when a position of a pointer on the display automatically moves regardless of movement of a pointing device associated with the pointer due to the process of the computer that changes a layout of the picture shown on the display, a position where the graphical user interface is displayed on the picture according to the position of the pointer on the picture, to move the graphical user interface with the pointer as the pointer automatically moves.

7. A computer-readable recording medium storing a program to control a computer to display a graphical user interface on a picture on a display of the computer, and comprising a process of:

determining whether indication of displaying the graphical user interface is input;

providing a transparency level table having predetermined levels of transparency of the graphical user interface to be displayed according to said determining indication, and reading the levels of transparency out of the transparency level table;

adjusting and displaying the graphical user interface according to the predetermined levels of transparency;

detecting a position of a pointer on the picture;

recording a time beginning with display of the graphical user interface, adjusting a level of transparency of the graphical user interface based on the recorded time reaching a predetermined time without a user input; and adjusting a level of transparency of the graphical user interface based on a distance between the detected position of the pointer and a position of the graphical user interface displayed on the picture on the display.

8. A computer-readable recording medium storing a program to control a computer to display a graphical user interface on a picture on a display of the computer, and comprising a process of:

determining whether indication of displaying the graphical user interface is input;

detecting a position of a pointer on the picture; and increasing a level of transparency of the graphical user interface when the pointer is positioned at approximately a center of the picture, and decreasing the level of transparency of the graphical user interface when the pointer is positioned at a side of the picture.

9. A computer-readable recording medium storing a program to control a computer to display a graphical user interface on a picture on a display of the computer during a process of the computer, and comprising a process of varying, when a position of a pointer on the display automatically moves regardless of movement of a pointing device associated with the pointer due to the process of the computer that changes a layout of the picture shown on the display, a position where the graphical user interface is displayed on the picture according to the position where the pointer is displayed, to move the graphical user interface with the pointer as the pointer automatically moves.

10. A method of providing an electronic document on a screen of a display, the method comprising:

displaying the electronic document to a user;

displaying a GUI mark for moving and zooming in/out the electronic document on the screen and an indication mark for indicating the GUI mark; and varying the GUI mark in response to at least one of a position where the GUI mark is displayed by increasing a level of transparency of the GUI mark when positioned at approximately a center of the electronic document and decreasing the level of transparency of the GUI mark when positioned at a side of the electronic document, a distance between the GUI mark and the indication mark, and an elapsed time after the electronic document is moved or zoomed in/out by the GUI mark.

11. The method of providing an electronic document as claimed in claim 10, wherein the GUI mark is varied in level of transparency.

12. The method of providing an electronic document as claimed in claim 10, wherein the GUI mark is varied in size.

13. The method of providing an electronic document as claimed in claim 10, wherein the GUI mark is varied in position.

14. The method of providing an electronic document as claimed in claim 10, wherein the indication mark is a pointer.

* * * * *

UNITED STATES PATENT AND TRADEMARK OFFICE
CERTIFICATE OF CORRECTION

PATENT NO. : 6,741,266 B1
DATED : May 25, 2004
INVENTOR(S) : Toru Kamiwada et al.

It is certified that error appears in the above-identified patent and that said Letters Patent is hereby corrected as shown below:

Column 11,
Line 23, delete ",".
Line 25, change "interface-based" to -- interface based --.

Signed and Sealed this

Thirty-first Day of August, 2004

JON W. DUDAS
*Director of the United States Patent and Trademark Office*